United States Patent [19]
Tass

[11] 3,912,326
[45] Oct. 14, 1975

[54] TAIL GATE

[76] Inventor: Richard L. Tass, 45 N. Main St., Buffalo, Wyo. 82831

[22] Filed: Apr. 15, 1974

[21] Appl. No.: 461,240

[52] U.S. Cl. ............... 296/51; 296/57 R; 49/158; 49/159
[51] Int. Cl.[2] ........................................ B62D 25/00
[58] Field of Search ....... 296/51, 50, 57 R, 61, 155; 49/158, 164, 159, 160, 449, 450, 70

[56] References Cited
UNITED STATES PATENTS

| | | | |
|---|---|---|---|
| 518,983 | 5/1894 | Zimmer | 296/155 |
| 696,943 | 4/1902 | Clayton | 49/159 |
| 703,908 | 7/1902 | Fischer | 49/158 X |
| 895,988 | 8/1908 | Edmondson | 49/450 |
| 1,393,959 | 10/1921 | Penny | 296/50 X |
| 1,864,660 | 6/1932 | Miller | 296/51 |
| 2,695,192 | 11/1954 | Strom | 296/50 |
| 3,502,367 | 3/1970 | Oliver | 296/50 |
| 3,763,827 | 10/1973 | Burkart | 296/61 X |
| 3,820,285 | 6/1974 | Shiffler et al. | 49/450 |

Primary Examiner—Robert J. Spar
Assistant Examiner—Donald W. Underwood
Attorney, Agent, or Firm—Victor J. Evans & Co.

[57] ABSTRACT

A tail gate is provided that includes a member that can either pivot downwardly to an inclined position, or the tail gate can be moved laterally to provide an access opening in the rear of a vehicle, trailer or the like.

1 Claim, 7 Drawing Figures

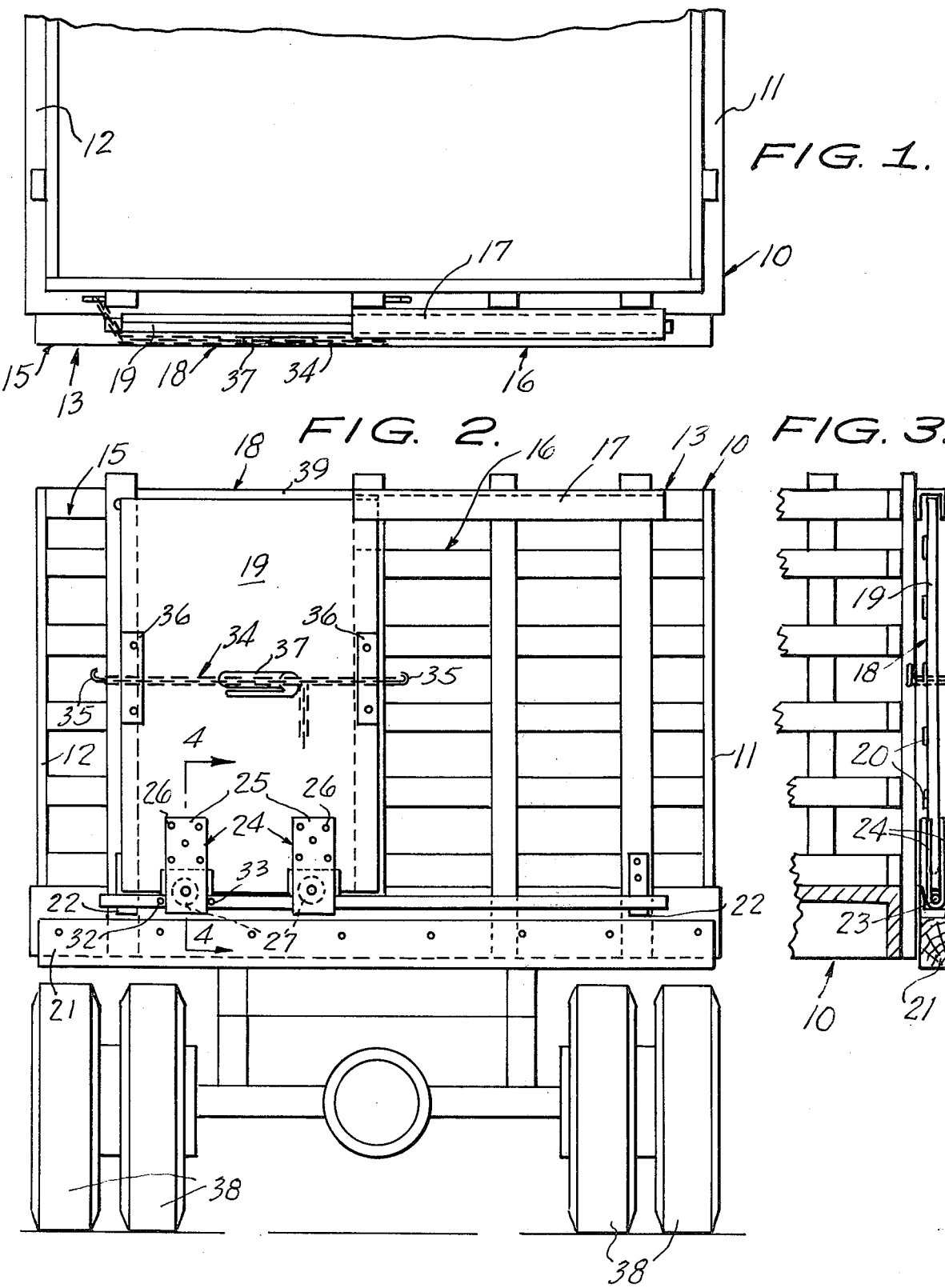

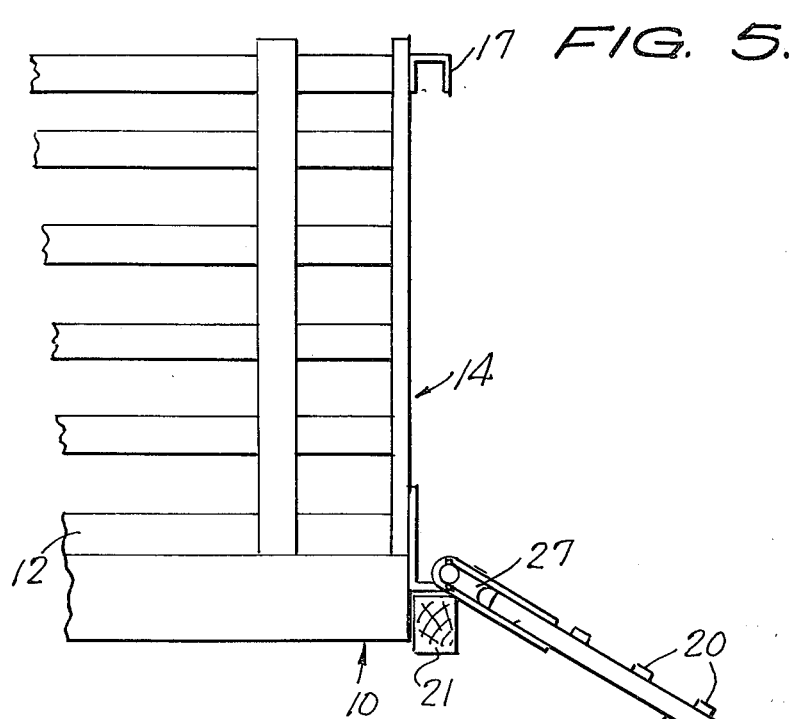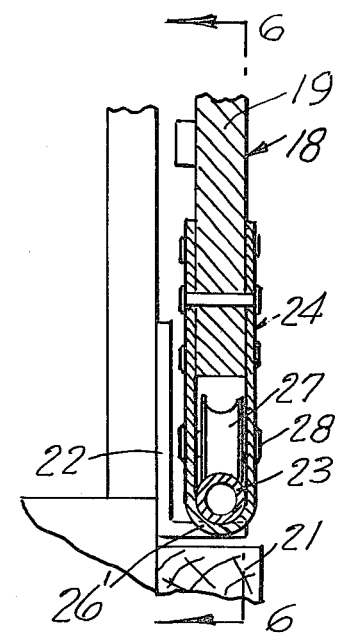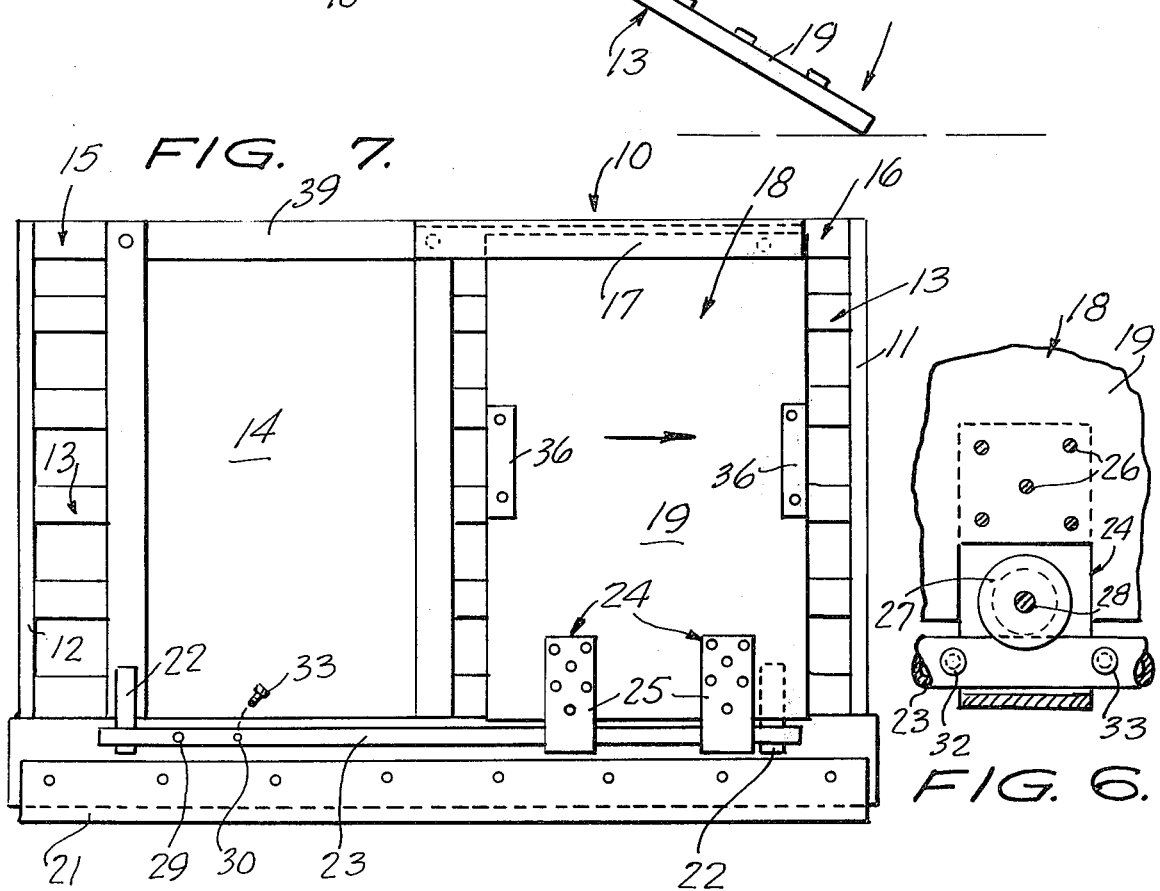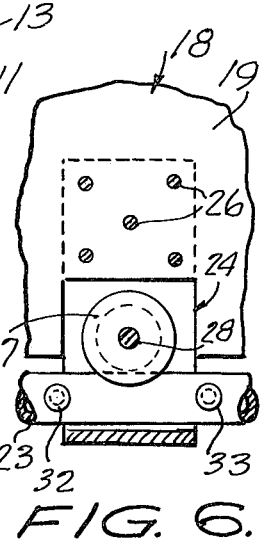

TAIL GATE

BACKGROUND OF THE INVENTION

Field of the Invention

The present invention relates to vehicles such as trucks, and more particularly to a tail gate for such a vehicle.

SUMMARY OF THE INVENTION

A tail gate for a vehicle such as a truck is provided that includes a member that either can be moved to an inclined position, or else the member can be slid or moved laterally sideways to provide an access opening in the rear of the vehicle. The construction of the tail gate permits the loading of live stock in the field without the necessity of providing loading chutes or embankments, and wherein the tail gate can be easily handled by one person.

The primary object of the present invention is to provide a tail gate that can be lowered to provide a ramp whereby a horse or the like can walk into and out of the vehicle, and wherein when desired the tail gate can be moved laterally or sideways so that the tail gate can be opened when the truck is arranged against a loading chute or other member.

Still another object of the present invention is to provide a tail gate that is ruggedly constructed, fool proof in use, efficient in operation and relatively simple and inexpensive to manufacture and install.

Other objects and advantages will become apparent in the following specification when considered in light of the attached drawings.

BRIEF DESCRIPTION OF THE DRAWINGS

FIG. 1 is a top plan view showing a portion of a vehicle equipped with the tail gate of the present invention;

FIG. 2 is a rear end elevational view of the device of FIG. 1 and showing the tail gate in closed position;

FIG. 3 is a fragmentary side elevational view showing certain constructional details of the present invention;

FIG 4 is an enlarged sectional view taken on the line 4—4 of FIG. 2;

FIG. 5 is a fragmentary elevational view showing the tail gate in inclined position;

FIG. 6 is a sectional view taken on the line 6—6 of FIG. 4; and

FIG. 7 is a view generally similar to FIG. 2 but showing the door moved so that the door or tail gate is open.

DESCRIPTION OF THE PREFERRED EMBODIMENT

Referring now to the drawings in detail, wherein like reference characters indicate like parts throughout the several figures, the reference numeral 10 indicates a portion of a vehicle such as a truck that includes sides 11 and 12 that are vertically disposed, and the truck or vehicle 10 further includes a back portion 13 that has an opening 14 therein, FIG. 7. The back portion 13 includes first and second sections 15 and 16 that are arranged in spaced apart relation with respect to each other, and the opening 14 is offset from the center of the back portion 13.

As shown in the drawings there is provided a U-shaped rail 17 that is secured to the top outer portion of the second section 16, for a purpose to be later described. The numeral 18 indicates the tail gate that consists of a generally rectangular panel 19, and a plurality of spaced apart bars 20 are adapted to be secured to one surface of the panel 19 as shown in FIG. 5.

As shown in the drawings there is provided a horizontally disposed base piece or beam 21 that is secured along the lower outer surface of the back portion 13, and the numeral 22 indicates L-shaped support members that are arranged as shown. A horizontally disposed tubular member 23 is mounted above the base piece 21, and a pair of spaced apart support members 24 have flanges 25 secured as at 26 to the lower portion of the panel 19. The support members 24 further include lower arcuate sections or portions 26', FIG. 4. The numeral 27 indicates rollers that are journalled in the support members 24 by means of pins 28.

The tubular member 23 is provided with a pair of spaced apart openings 29 and 30, FIG. 7, and stop pins 32 and 33 are releasably mounted in the openings 29 and 30.

The numeral 34 indicates a locking chain assembly that has hooks 35 on it's ends for engaging the sections 15 and 16 of the back portion 13, FIG. 2, and the chain assembly 34 includes an actuating section or portion 37. As shown in FIG. 2 the numeral 38 indicates the rear wheels of the truck or vehicle 10.

From the foregoing, it will be seen that there has been provided an improved tail gate for a vehicle such as a truck, and in use with the parts arranged as shown in drawings, when the tail gate is in the closed position, the tail gate 18 closes the opening 14 as shown in FIGS. 1 and 2. In the position of FIGS. 1 and 2 the chain assembly 34 serves to maintain the door or tail gate 18 in closed position so that accidental opening thereof is prevented. In addition the pins 32 and 33 extend through their respective openings 29 and 30 in the tubular member 23 whereby accidental shifting or lateral sideways movement of the tail gate 18 will be prevented.

When it is desired to move the tail gate 18 to a position such as that shown in FIG. 5, the chain mechanism 34 is unlocked whereby the tail gate 18 can move from the vertical position of FIGS. 1 and 2 to an inclined position such as that shown in FIG. 5 whereby horses, animals and the like can move up or down the tail gate 18 so that the tail gate 18 functions as an inclined ramp. The plurality of bars 20 that are secured to the inner surface of the panel 19 of the tail gate 18 provide an anti-slip surface for the animals moving up or down the ramp. With the tail gate 18 in the inclined position of FIG. 5, the opening 14 will be exposed so that the animals can readily enter or leave the body 10 in a desired manner.

When it is not convenient or suitable to arrange the tail gate 18 in the inclined position shown in FIG. 5, as for example when there is insufficient space or other conditions that do not make it suitable to move the tail gate 18 to the position of FIG. 5, then the tail gate 18 can be moved from a position such as that shown in FIGS. 1 and 2 to a position shown in FIG. 7.

When moving the tail gate 18 from the position shown in FIGS. 1 and 2 to the position shown in FIG. 7, the pins 32 and 33 are selectively removed from their openings 29 or 30, and the chain mechanism 34 is released whereby the tail gate 18 can move from left to right, that is the tail gate 18 can move from a position such as that shown in FIG. 2 to a position such as that shown in FIG. 7 in order to expose the access opening 14.

It is to be noted that when the tail gate 18 moves to the position shown in FIG. 7, the rollers 27 conveniently engage the tubular member 23 to permit this lateral sideways movement of the tail gate with a minimum amount of friction. In addition the upper rail 17 provides a sliding support for the top of the tail gate 18 so that the tail gate will be maintained or retained in it's proper position as it moves sideways.

It will be noted that the rail 17 is of a proper length so that for example when it is desired to move the tail gate to the position shown in FIG. 5, the pin 32 can be initially removed from it's opening 29 whereby the tail gate 18 can be moved slightly to the left from a position shown in FIG. 2 whereby the upper corner of the tail gate will clear the adjacent edge or corner of the rail 17 in order to permit the tail gate to move to the desired inclined position.

The parts can be made of any suitable material and in different shapes and sizes as desired or required.

It will be seen that there has been provided an easy loading tail gate that consists of a combination sliding tail gate and ramp which can open when backed against a loading dock, and wherein the tail gate can also be dropped to form a ramp when conditions warrant.

The E-Z loading tail gate of the present invention is especially suitable by ranchers, horse owners and the like. The tail gate can be made of aluminum or wood, and it permits the tail gate to open while the truck is against the loading chute which is not possible with traditional tail gate assemblies. In addition to this advantage, the tail gate can be lowered to provide a ramp up which a horse could walk to get into the vehicle and this is an important advantage. At the present time stock is generally hauled in vehicles which are equipped with tail gates that either swing out to open or close and thus cannot be used near a loading chute. Other varieties of gates raise from the rest of the rack and as such interfere with the loading operations, and the present invention is an improvement over these prior methods. In addition the present invention permits the loading of live stock in the field without the necessity of loading chutes or embankments so that wasted time is prevented. The tail gate can be made inexpensively and can be easily handled by one person.

It will therefore be seen that there has been provided a side rolling end gate that can be laid down to form a ramp as shown in FIG. 5. The chain and boomer 34 serve to selectively secure the gate in place. The removeable pin 32 serves as a gate stop on the left side to stop the gate from accidently laying down. The removeable pin 33 serves as a safety to prevent the gate from opening by rolling to the right side. The parts can be made so that they can be disconnected or removed when desired. The guards 36 may be made of metal and serve to protect the gate from the chains. The support members 24 function as gate hinges and supports for the rollers 27. Also, the gate can be modified to fit pickups and trailers.

The E-Z loading stock gate of the present invention is a side rolling ramp and gate for a stock rack that can be opened from a ramp, or it can be rolled to the side to permit entrance and exit from the stock bed. Suitable stabilizers braces and the like can be used where needed to reinforce weak portions of existing stock racks. The numeral 39 indicates a top brace that can be installed on the inside of the end panel by suitable bolts, whereby when desired or required, the top brace 39 can be easily removed in order to allow the loading and unloading of tall animals.

Also, as noted in the drawings a chain and boomer 34 with suitable end hooks 35 is adapted to be inserted through the vertical post of the end panel or arranged adjacent the end panel as shown. When the ramp gate is in the closed position, the chain 34 can be tightened with the boomer so that it will act to hold the ramp gate closed and increase the vertical stability of the ramp gate. Nut portions of the end hooks can be provided to which the chain and boomer are attached and these may be counter sunk into vertical upright braces so that they will not protrude into the gate way and thus potentially injure animals entering or leaving the stock bed. To open the ramp gate the boomer and chain are unfastened, and the appropriate safety pin is adapted to be removed whereby the ramp gate can be either lowered or rolled to the side.

The pipe roller track may be of a suitable size such as two inches in diameter and is held in place by suitable brackets or support members, and the pipe or tubular member 23 may be suitably welded in place to the adjacent support pieces.

The length dimensions of the guard rail 17 are slightly longer than the width of the ramp gate being used, and the rail 17 may be attached outside of the stock rack on the vertical post of the end panel on the right side of the stock rack. The interior dimensions of the rail 17 are slightly greater than the thickness of the ramp gate so that the ramp gate can move within the rail 17. The rail 17 permits the gate 18 to be rolled on the pipe roller track to the right and prevents the gate from laying down, or the gate may be moved to the left to disengage it from the rail 17 so that the gate can be used as a ramp as shown in FIG. 5.

The safety pins 32 and 33 serve as ramp gate stops. There are two pins 32 and 33 that are inserted through the pipe roller track 23 that serves to hold the ramp gate in place. These pins prevent the rollers from moving either right or left upon the pipe roller track. If the left pin 32 is removed and the ramp gate is rolled to the left, the gate is lowered to be used as a ramp. If the right pin 33 is removed the ramp gate is free to operate upon the track and can be moved to the right to act as a sliding door.

The guards 36 can be optional items and when used will serve to protect the ramp gate from damage caused by the use of the chains and boomer.

The gate hinges and roller assembly are mounted on the pipe roller track 23 as previously described. The gate hinge and roller assembly are constructed so that if the gate is desired to open as a sliding door the right safety pin 33 is removed and the rollers 27 move along the pipe roller track 23 at the bottom, and the top of the ramp gate moves through the rail 17 as previously described. It will be understood that the gate is closed by reversing this procedure.

Also, if the ramp gate is desired to be lowered to be used as a ramp, the left safety pin 32 is removed and the gate is moved to the left to disengage the top of the ramp gate from the rail 17 so as to permit the ramp gate to lower with the top portion of the gate swing down to form a ramp upon which animals can enter and leave from the stock bed.

The numeral 20 indicates tread strips made of wood or the like that help prevent the animal from slipping when entering or departing from the stock bed.

The stock gate of the present invention can be modified to fit pickup trucks, trailers or trucks. It is relatively inexpensive, permits the stock rack to be open while the truck is adjacent a loading chute or permits animals to enter or leave the stock bed when no loading chute facilities are available by allowing the ramp gate to be lowered, and also animals can enter or leave by crossing the ramp.

If desired as an optional piece of equipment, a small pulley and cable can be used that will permit the ramp to be raised with little effort. Such a pulley can be attached to the left end panel post adjacent to the ramp area, and a cable can extend through this pulley to the end of the ramp gate so that by exerting force on the cable, the ramp gate can be raised or lowered with very little effort.

Having thus described the preferred embodiment of the invention it should be understood that numerous structural modifications and adaptations may be resorted to without departing from the spirit of the invention.

What is claimed is:

1. In a tail gate for an animal carrying vehicle, a body including a pair of spaced parallel vertically disposed sides extending upwardly in said body, a back portion extending vertically upwardly in said body at the rear thereof and including a pair of spaced apart sections with the first of said sections substantially shorter in a horizontal direction than the second of said sections with said sections defining an offset opening therebetween, an inverted U-shaped generally horizontal rail rigidly secured to the top portion of said second section and extending substantially thereacross, a horizontally disposed tubular member secured to said back portion at the lower portion thereof, a pair of spaced apart support members each having spaced apart flange portions with said support members encompassing said tubular member, a roller journalled between the flange members of each of said support members and supported on said tubular member, a rectangular panel having its lower edge secured to said support members and a portion of its upper edge engaged in said rail, said panel having a horizontal extent greater than the horizontal extent of said opening, a pair of spaced bores in said tubular member arranged on opposite sides and closely adjacent one of said support members, stop pins removably mounted in said bores for preventing substantial horizontal movement of said panel, said panel on removal of one of said pins being movable horizontally from a position to the rear of and covering said opening to a position to the rear of said second section uncovering said opening, said panel on removal of the other of said pins being movable horizontally in a direction toward said first section to disengage the upper edge of said panel from said rail to permit said panel to hinge downwardly and rearwardly about the axis of said tubular member to form a loading ramp for said body, and a locking chain releasably secured at opposite ends to said first and second sections intermediate the upper and lower portions thereof to secure said panel in a position covering said opening.

* * * * *